S. MILES.
Oatmeal Machine.

No. 204,837.  Patented June 11, 1878

Witnesses
John Becker
Fred Haynes

Inventor
Sweeting Miles
by his Attorneys
Brown & Allen

UNITED STATES PATENT OFFICE.

SWEETING MILES, OF CLOSTER, NEW JERSEY.

IMPROVEMENT IN OATMEAL-MACHINES.

Specification forming part of Letters Patent No. 204,837, dated June 11, 1878; application filed February 1, 1878.

*To all whom it may concern:*

Be it known that I, SWEETING MILES, of Closter, in the county of Bergen and State of New Jersey, have invented an Improved Grain-Reducing Machine; and I do hereby declare that the following is a full, clear, and exact description of the same, reference being had to the accompanying drawing, forming part of this specification.

My invention relates to that class of grain-reducing machines in which hulled oats, wheat, or other grains are coarsely divided by cutting instead of cracking or coarsely grinding the same, such machines having been found to produce less "fine stuff" than cracking or crushing machines.

The invention has for its object the supply of a machine cheaper, more durable, and more efficient than others of its class hitherto applied.

The invention consists in a series of revolving circular-edged knives, a toothed carrying, feeding, and holding cylinder, the teeth of which work between the edges of the said knives, as hereinafter described, to present the grain to be cut to the said knives in such manner that the said grains shall be cut crosswise of their longitudinal axis, and a trough or box arranged below the said cylinder, and receiving the lower part of the said cylinder, for presenting the grain to be cut to the said cylinder, substantially as and for the purpose specified.

Figure 1:
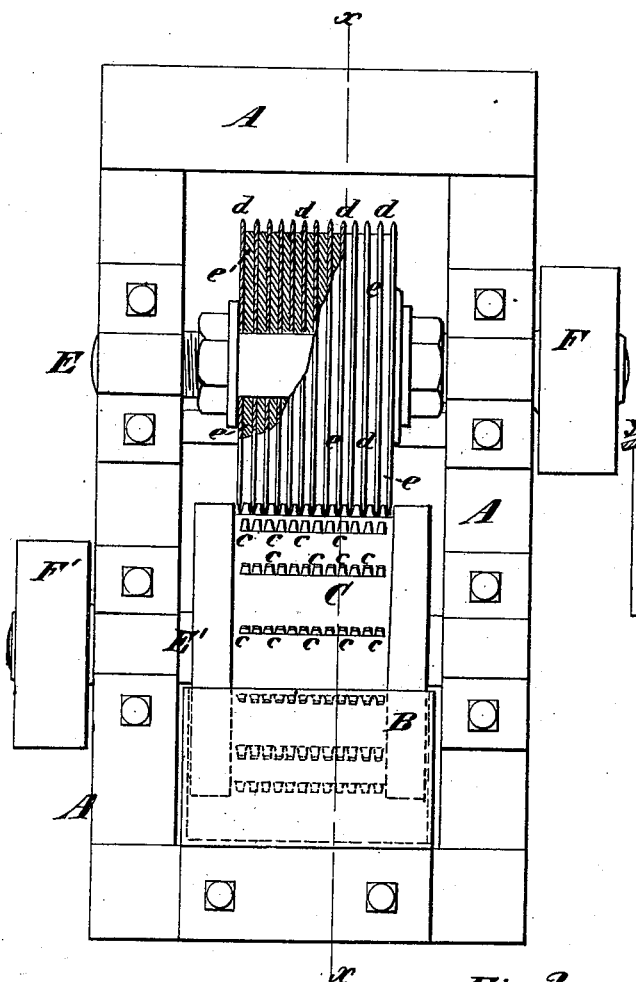
Figure 2:
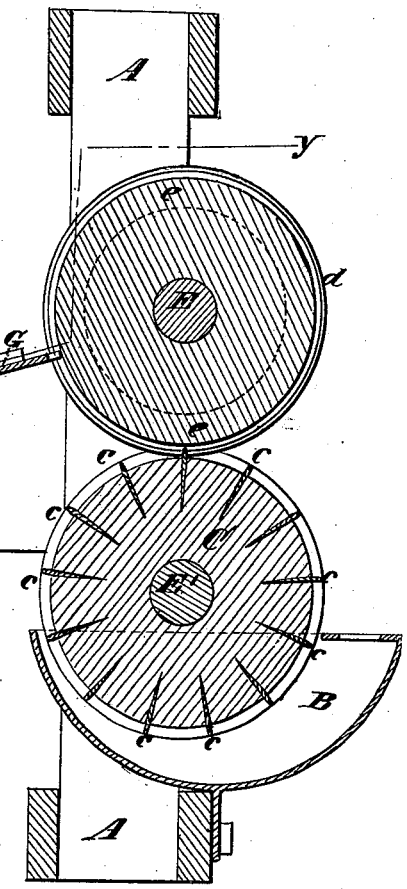
Figure 3:
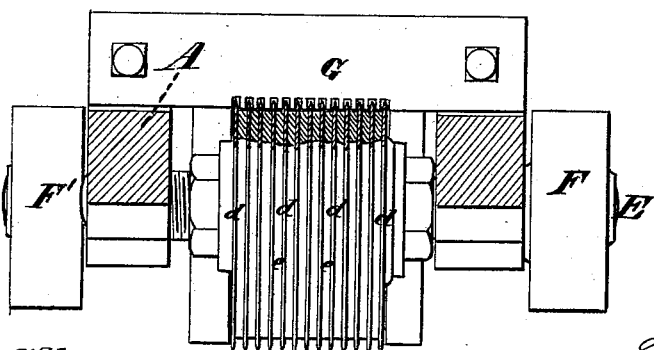

Figure 1 in the drawing represents a partial elevation of one side and a partial section of a machine constructed in accordance with my invention. Fig. 2 is a vertical section of the same, made on the line $x\,x$ in Fig. 1. Fig. 3 is a section made on the line $y\,y$ in Fig. 2.

A is a frame, which supports the working parts of the machine. To the lower part of the said frame is attached a trough or box, B. In the said trough or box B revolves a cylinder, C, the said trough or box being placed below the said cylinder to receive the lower part of the said cylinder, and to present the grain to be cut to the said cylinder, as hereinafter described. Said cylinder may be of wood, of wood coated with rawhide, or of any other material that will not dull the edges of the knives working over or upon it; or, with a nice adjustment, the said cylinder may be made of metal.

The said cylinder is provided with rows of teeth $c$, set in its periphery, the said rows being straight, and arranged parallel to the axis of revolution of the said cylinder.

When the said cylinder revolves, and grain is placed in the trough or box B, the teeth $c$ act as carriers and holders to feed the grain to knives $d\,d$, hereinafter described, the teeth carrying the grains up horizontally and presenting them to the circular edges of the rotary knives $d\,d$, with the longitudinal axis of the said grains at, or very nearly at, right angles to the said edges. The said grains are, therefore, cut crosswise through their longitudinal axis. The series of circular-edged knives $d\,d$ are placed in such relation with the said carrying, feeding, and holding cylinder that the parallel edges of the said knives enter between the said teeth, and either bear directly upon the said cylinder between the said teeth, or approach so nearly to the said surface as to insure the complete cutting of the grain as it is presented to the said edges by the said cylinder. The said knives are arranged on a shaft, E, provided with a pulley, F, and are held in parallel relation with each other, and with the said shaft by interposed disks $e$. The carrying-cylinder is arranged on a shaft, E', provided with a pulley, F'. Both the said shafts have suitable bearings in the frame A.

G is a toothed scraper, the teeth of which enter between the edges of the cutters $d$, and keep the spaces between the said cutters clean. Said scraper is attached to the frame A in any suitable manner.

The operation of the machine is as follows: The cylinder C and the revolving cutters $d\,d$ are simultaneously revolved, and the grain to be reduced is placed in the hopper B. The teeth of the said cylinder then carry up the grain to the top of said cylinder, the action of gravity and the normal action of the teeth in the mass of grain being such as to present the grains to the edges of the cutters in a position at right angles with the edges of the said cutters, the passage of the grains under the said cutters cutting them cleanly crosswise with the longitudinal axis of the said grains, and in a gradual manner, by a rolling edge, instead of applying all the pressure necessary to make the complete cut at any one time to the grain, and I thereby avoid the objectionable crushing action of chisel-edged cutters with edges parallel to the axis of rotation.

The cutters may not be made of single disks, but may be made in pieces, sections, or segments, provided the said segments or sections, when put together, present in each of the said cutters a continuous circular edge, operating substantially as described, in relation with the carrying, feeding, and holding cylinder C.

I claim—

The combination of the series of revolving circular-edged knives $d\ d$, the toothed carrying, feeding, and holding cylinder C, the teeth of which work between the edges of the said knives to present the grain to be cut to the said knives, as herein described, and the trough or box B, arranged below the said cylinder and receiving the lower part thereof, for presenting the grain to be cut to the said cylinder, substantially as and for the purpose specified.

SWEETING MILES.

Witnesses:
VERNON H. HARRIS,
FRED. HAYNES.